United States Patent
Herrmann

(10) Patent No.: US 6,825,629 B2
(45) Date of Patent: Nov. 30, 2004

(54) METHOD OF CONTROLLING A WIPER MOTOR

(75) Inventor: Wolfgang Herrmann, Freising (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/258,297

(22) PCT Filed: Feb. 28, 2001

(86) PCT No.: PCT/DE01/00756
§ 371 (c)(1),
(2), (4) Date: Mar. 14, 2003

(87) PCT Pub. No.: WO01/81134
PCT Pub. Date: Nov. 1, 2001

(65) Prior Publication Data
US 2003/0169008 A1 Sep. 11, 2003

(30) Foreign Application Priority Data
Apr. 26, 2000 (DE) .......................................... 100 20 330

(51) Int. Cl.$^7$ .............................. B60S 1/02; B60S 1/04; H02P 1/04
(52) U.S. Cl. ................. 318/483; 318/465; 318/DIG. 2; 15/250
(58) Field of Search .............................. 318/443, 444, 318/445, 465, 483, DIG. 2; 15/250.001, 250.12, 250.13, 250.16; 340/602, 604, 438

(56) References Cited

U.S. PATENT DOCUMENTS

| | | | | |
|---|---|---|---|---|
| 4,710,878 A | * | 12/1987 | Iyoda | 318/483 |
| 4,740,735 A | * | 4/1988 | Hayashi | 318/483 |
| 5,140,233 A | * | 8/1992 | Wallrafen | 318/264 |
| 5,140,234 A | * | 8/1992 | Wallrafen | 318/264 |
| 5,252,898 A | * | 10/1993 | Nolting et al. | 318/444 |
| 5,581,240 A | * | 12/1996 | Egger | 318/483 |
| 6,084,519 A | * | 7/2000 | Coulling et al. | 15/250.12 |
| 6,218,741 B1 | * | 4/2001 | Braun et al. | 318/483 |

FOREIGN PATENT DOCUMENTS

| | | | |
|---|---|---|---|
| DE | 41 34 432 | 4/1993 | |
| EP | 0 926 026 | 6/1999 | |
| EP | 926026 A2 | * 6/1999 | ............. B60S/1/08 |

* cited by examiner

Primary Examiner—Randy W. Gibson
Assistant Examiner—Eduardo Colon Santana
(74) Attorney, Agent, or Firm—Kenyon & Kenyon

(57) ABSTRACT

A method and a device for controlling a wiper motor of a motor vehicle. A rain sensor sends signals to a control device and the wiper motor is switched off when a first threshold is exceeded or is not reached. After a defined time period after switching off the wiper motor, the wiper motor is switched on in order to remove residual wetness when the signals exceed or drop below a lower, second threshold.

21 Claims, 1 Drawing Sheet

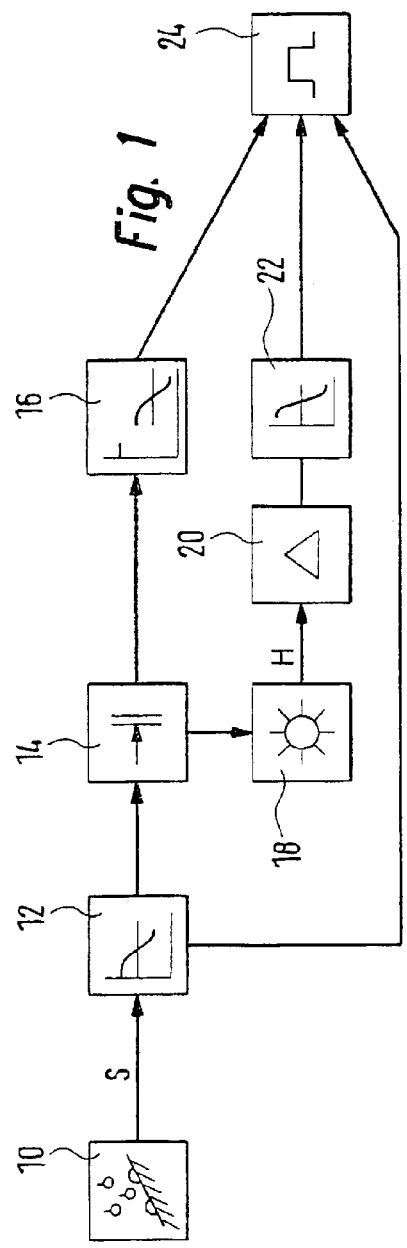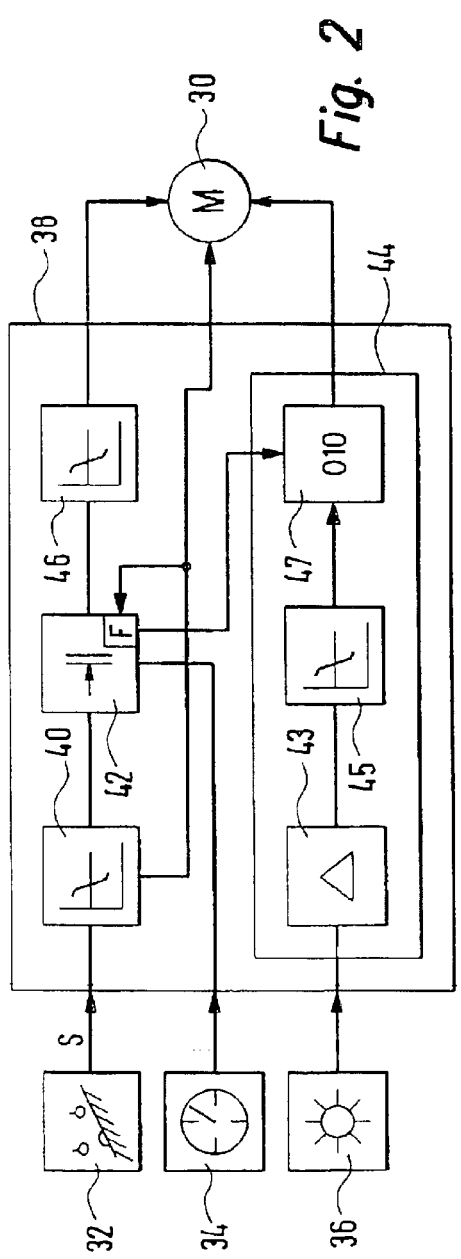

METHOD OF CONTROLLING A WIPER MOTOR

FIELD OF THE INVENTION

The present invention relates to a method and a device for controlling a wiper motor.

BACKGROUND INFORMATION

Numerous conventional methods of controlling a wiper motor involve adjusting the response sensitivity of a rain sensor as a function of an additional brightness sensor.

A method of adjusting the response sensitivity of a rain sensor is described in German Published Patent Application No. 41 34 432 in which the response sensitivity may be adjusted by an additional brightness sensor or by a switch-on signal of a light switch. In addition, it is conventional that the amplification of a rain sensor signal may be influenced by the external protective circuit as a function of the ambient brightness.

However, in all of these methods and devices, residual wetness is frequently encountered on the windshield, which is troublesome, especially in darkness.

SUMMARY OF THE INVENTION

The method according to the present invention may provide the advantage that residual wetness, which may still be present on the windshield after the wiper motor has been switched off, is detected and removed.

After it has stopped raining, streaks often remain on the windshield which do not dry by themselves and which may thus represent residual wetness. By re-evaluating the signals from the rain sensor after a defined time after the wiping operation has ended and checking against a second threshold, one or more additional wiping operations may be triggered, as needed. In this manner, the residual wetness is removed, thereby significantly improving visibility.

An additional significant advantage may be realized when this method is supplemented by an ambient brightness signal, using a brightness sensor, and the wiper motor is actuated at a defined change in the ambient brightness. In this manner, consideration is made for the fact that residual wetness on the windshield is even more troublesome in darkness than in normal daylight.

This significant advantage may be realized when entering tunnels or parking garages in which the ambient brightness quickly changes from light to dark. If the wiper motor was in intermittent operation, for example, before entering, the windshield is normally wet upon entering the tunnel. After entry has been recognized by detection of the change in the ambient brightness, it possible to trigger a wiper operation and thus remove troublesome residual wetness.

In such cases it may be of further advantage when the wiper motor is actuated for only a single wiper cycle. Although residual wetness is generally troublesome, there is little associated moisture. The residual wetness may thus be removed in one wiper cycle, thereby preventing abrasive stress such as rattling or squeaking of the wiper on the windshield.

Furthermore, it may be advantageous when the wiper motor is actuated only when a moisture exceeds or drops below a threshold of the rain sensor, since in this manner it is possible to prevent dry friction of the wiper against the windshield.

The device according to the present invention may provide the advantage that visibility-impairing residual wetness remaining on the windshield caused by unevaporated smears or drops may be removed.

It may be advantageous when the trigger stage includes a first threshold value analyzer which compares the signals to a first threshold and which is connected, via a delay element connected to a timer, to a second threshold value analyzer which compares the signals to a second threshold and which triggers a single wiper cycle when the second threshold is exceeded or is not reached. A simple and practical device for removing residual wetness on a windshield is thus provided.

If this device also includes a brightness sensor, the trigger stage actuating the wiper motor at a defined change in brightness when the wiper motor has already been actuated within a predetermined time, the history of the wiping operation may thus be advantageously taken into account. If a continuous wiping operation was still in progress two minutes, for example, before a large change in brightness, it may be concluded with reasonable certainty that residual wetness is still present on the windshield.

In addition, it may be advantageous when the device has a brightness analysis stage which compares the changes in signals from the brightness sensor to the defined change in brightness.

If the timer or the delay element also includes a flag indicating a wiper cycle which is reset only after a predetermined time has elapsed, it may be determined at any time whether a wiper cycle has been triggered or ended within a predetermined historical time period.

It may be of significant advantage if the evaluation stage is configured in such a manner that it triggers a single wiper cycle only when the flag of the timer or delay element is simultaneously set and the threshold of the defined change in brightness is exceeded or is not reached. Thus, a single wiper cycle is triggered only when the brightness analysis stage gives a positive result and the last wiping operation has occurred fairly recently, since in this case it may be concluded that residual wetness is present on the windshield.

Example embodiments of the present invention are illustrated in the drawings and described in the following description.

BRIEF DESCRIPTION OF THE DRAWINGS

FIG. 1 shows the method according to the present invention in a schematic illustration.

FIG. 2 shows a device according to the present invention in a schematic illustration.

DETAILED DESCRIPTION

FIG. 1 shows a schematic illustration of the method according to the present invention. Signals S relayed in sensor step 10 represent a measure of the moisture present on the windshield of a motor vehicle. Without limiting the character, it is assumed in the following description that the greater the signal S, the greater the wetness on the windshield, and therefore the greater the moisture.

In a first step 12 these signals are checked whether they exceed a specified first threshold S1, and thus, whether a given moisture level has been reached. First threshold S1 is a fixed threshold, but may also be variable. Numerous such methods are conventional, i.e., methods in which threshold S1 is controlled as a function of the sensor signal itself, using a historical average value.

If the sensor signal drops below this first threshold S1, wiper motor 30 (FIG. 2) is switched off in a trigger stage 38, since the moisture on the windshield has decreased. At this point, however, the windshield frequently still has residual wetness, from which it may generally be assumed that the residual wetness will most likely soon disappear by evaporating on its own. However, this is not always the case. For this reason, in a second step 14 waiting is performed for a defined time T1, and in a third step 16 it is checked for whether or not the sensor signal is below a second threshold S2. This second threshold S2 is lower than first threshold S1, and thus corresponds to a lower degree of moisture.

If the signal is below this second threshold S2, it is assumed that the residual wetness on the windshield has disappeared due to evaporation or wind drifts, and that no further wiping operations will be triggered. However, if this second threshold is exceeded or is not met after time t has elapsed, it is assumed that residual wetness is present on the windshield, and a wiping operation is begun to remove the residual wetness.

In one variation, after first threshold S1 has not been reached a signal for the ambient brightness may trigger a wiping operation. To this end, the changes in the signal for the ambient brightness are detected in a brightness detection step 18 and a differential step 20, and when the value falls below a set, defined change, a wiping operation is triggered in a comparison step 22.

This addition may be practical, since residual wetness on the windshield is considered to be troublesome when a tunnel or parking garage, for example, is entered. The sudden change in ambient brightness H is detected, and then a wiping operation is triggered.

Of course, both options may be combined if desired, so that a specific moisture threshold Sf is present before a wiping cycle is triggered regardless of, for example, whether the defined change in ambient brightness has been exceeded.

FIG. 2 shows a device according to the present invention for controlling wiper motor 30. A rain sensor 32, a timer 34, and a brightness sensor 36 send their signals to a trigger stage 38. This trigger stage 38 controls wiper motor 30.

Trigger stage 38 includes a first threshold value analyzer 40 which receives signal S from rain sensor 32. The output of this first threshold value analyzer 40 is connected directly to wiper motor 30, and its other output is connected to a delay element 42.

Delay element 42 also includes a flag F which is set when a wiper cycle has ended. The flag is reset when defined time T1 has elapsed and flag F has not been reset in the meantime. Depending on the choice of defined time T1, care is taken that flag F is not set after a wiper cycle which serves only to remove residual wetness.

Therefore, delay element 42 receives at its input the signal from first threshold value analyzer 40 as well as the signal from timer 34. An output from delay element 42 is connected to a brightness analysis stage 44 which is also connected directly to wiper motor 30 and is able to actuate the wiper motor.

Another output of delay element 42 is connected to second threshold value analyzer 46, which is also capable of triggering wiper motor 30.

Brightness analysis stage 44 includes a differential element 43, a brightness threshold stage 45, and a logic evaluator 47. The signal from brightness sensor 36 is sent to differentiating element 43, from there to brightness threshold stage 45, and then to logic evaluator 47, which activates wiper motor 30 depending on flag F.

The functioning of the device is explained in the following description. Rain sensor 32 measures the wetness present on the windshield. This signal S from rain sensor 32 is evaluated by first threshold value analyzer 12 to determine whether the signal has dropped below a first threshold S1, and thus whether the moisture has dropped below a given threshold, whereupon first threshold value analyzer 40 switches off wiper motor 30. Signal S is then relayed to delay element 42. The delay element is connected to timer 34. After the wiper motor has been switched off by first threshold value analyzer 40, delay element 42 sets flag F, which is configured as a simple high level on a control line. In addition, delay element 42 resets flag F after a predeterminable time T2. After a defined time T1 has elapsed, second threshold value analyzer 46 checks whether a second threshold S2, which typically is lower than first threshold S1, is still higher than second threshold S2.

If this is the case, an additional wiper operation is performed by wiper motor 30 to remove this residual which is apparently present. As soon as flag F is set, brightness analysis stage 44 is activated. The brightness analysis stage receives the signal from brightness sensor 36, differentiates this signal, and activates wiper motor 30 only when a defined change in the ambient brightness is detected.

The algorithm for logic evaluator 47 may be freely chosen.

What is claimed is:

1. A method of controlling a wiper motor of a motor vehicle, comprising:
   transmitting a signal from a rain sensor to a control device;
   determining an ambient brightness using a brightness sensor;
   switching off the wiper motor if the signal satisfies a first threshold condition;
   switching on the wiper motor to remove a residual wetness after a defined time period for which the wiper motor is switched off;
   switching on the wiper motor at a defined change in the ambient brightness when the wiper motor has already be actuated at least before a predeterminable time period;
   wherein the wiper motor is switched on in the switching steps only when a moisture threshold of the rain sensor satisfies a second threshold condition.

2. The method according to claim 1, wherein:
   the wiper motor is switched on after the defined time period only when the signal satisfies a third threshold condition.

3. The method according to claim 2, wherein the third threshold condition corresponds to the signal exceeding a second threshold, the second threshold lower than a first threshold of the first threshold condition.

4. The method according to claim 2, wherein the third threshold condition corresponds to the signal dropping below a second threshold, the second threshold lower than a first threshold of the first threshold condition.

5. The method according to claim 1, wherein:
   the wiper motor is switched on the switching step for a single wiper cycle.

6. The method according to claim 1, wherein the first threshold condition corresponds to the signal exceeding a first threshold.

7. The method according to claim 1, wherein the first threshold condition corresponds to the signal falling below a first threshold.

8. The method according to claim 1, wherein the second threshold condition corresponds to a moisture threshold of the rain sensor being exceeded.

9. The method according to claim 1, wherein the second threshold condition corresponds to a moisture threshold of the rain sensor being not reached.

10. A device for controlling a wiper motor, comprising:

a rain sensor that transmits a signal;

a timer; and a trigger stage that switches on the wiper motor, the wiper motor having been switched off after the signal satisfies a first threshold condition, after a defined time period, to remove a residual wetness;

wherein;

the trigger stage is configured to switch on the wiper motor after the defined time only when the signal satisfies a second threshold condition, a second threshold of the second threshold condition lower than a first threshold of the first threshold condition; and the trigger stage includes a first threshold value analyzer that compares the signal to the first threshold condition, the threshold value analyzer being connected, via a delay element connected to the timer, to a second threshold value analyzer that compares the signal to the second threshold condition and triggers a single wiper cycle when the signal satisfies the second threshold condition.

11. The device according to claim 10, further comprising:

a brightness sensor;

wherein the trigger stage actuates the wiper motor at a defined change in brightness when the wiper motor has already been actuated at least before a predetermined time period.

12. The device according to claim 11, wherein: the trigger stage actuates the wiper motor for only one wiper cycle.

13. The device according to claim 11, wherein:

the trigger stag includes a brightness analysis stage that compares a change in a signal from the brightness sensor to a defined change in brightness.

14. The device according to claim 10, wherein:

one of the timer and the delay element includes a flag indicating a wiper cycle which is reset only after a predetermined time period has elapsed.

15. The device according to claim 14, wherein:

the trigger stage is configured to trigger a single wiper cycle for removing a residual wetness when a defined change in ambient brightness satisfies a predetermined condition and the flag is set.

16. The device according to claim 15, wherein the predetermined condition corresponds to the defined change in the ambient brightness being exceeded.

17. The device according to claim 15, wherein the predetermined condition corresponds to the defined change in ambient brightness being not reached.

18. The device according to claim 10, wherein the first threshold condition corresponds to the signal exceeding a first threshold.

19. The device according to claim 10, wherein the first threshold condition corresponds to the signal dropping below a first threshold.

20. The device according to claim 10, wherein the second threshold condition corresponds to the signal exceeding the second threshold.

21. The device according to claim 10, wherein the second threshold condition corresponds to the signal dropping below the second threshold.

* * * * *